Feb. 17, 1942. L. BRÜCK 2,273,511
MEANS TO TRANSFORM AN ALTERNATING POTENTIAL
Filed Nov. 2, 1938
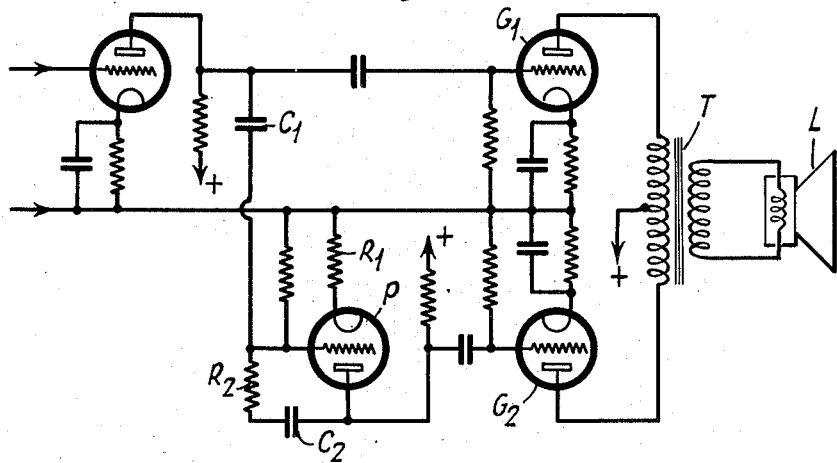
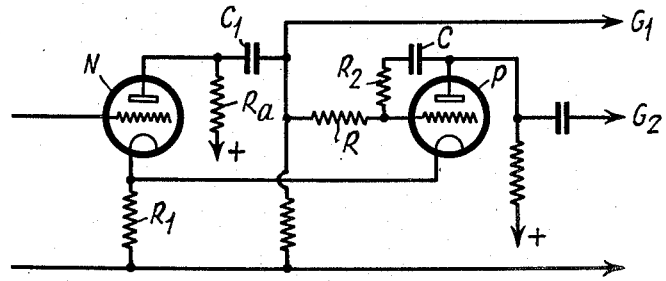
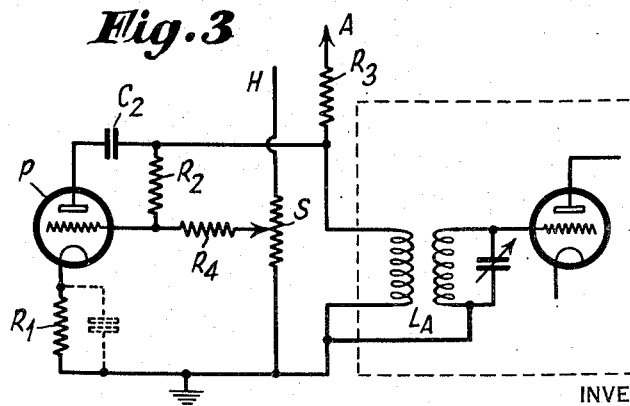
INVENTOR
LOTHAR BRÜCK
BY
ATTORNEY Patented Feb. 17, 1942

UNITED STATES PATENT OFFICE 2,273,511

MEANS TO TRANSFORM AN ALTERNATING POTENTIAL

Lothar Brück, Berlin-Tempelhof, Germany, assignor to Telefunken Gesellschaft für Drahtlose Telegraphie m. b. H., Berlin, Germany, a corporation of Germany Application November 2, 1938, Serial No. 238,341
In Germany November 27, 1937

4 Claims. (Cl. 179—171)

It is known in the prior art for coupling with a push-pull amplifier without the use of a transformer to use a phase reverser tube, the said tube being either included in a normal amplifier channel or being so connected that it serves solely for the purpose of insuring a phase reversal. A voltage divider connected at the input or output end serves the object of making the overall gain of the reverser stage equal to unity.

One demerit of such a scheme as known in the prior art inheres in the phase and amplitude distortions occasioned by such a phase reversal tube, and these distortions impair the performance and effectiveness of the following push-pull stage, for the reason that the two push-pull potentials fail to be accurately equal and in phase opposition. Another drawback is that the output potential of the phase reverser stage to a marked degree is a function of the gain of the tube and thus of the accidental properties of the tube that happens to be in use.

Now, according to the invention the phase reverser tube is subject to such strong negative feedback that the tube essentially is operating without any gain at all.

The advantage of the invention is that the requisite reduction in the gain is actually effected by the negative feedback or degeneration with the result that a voltage divider is dispensable wholly or at least in part. However, the chief advantage is that as a result of the negative feedback the amplitude and the phase distortions are minimized to an insignificantly low amount. As a result it is possible in an extremely simple way to so design the phase reversing stage that the output potential will be the exact mirror image or homolog of the input potential. A further advantage is that the gain of the stage (without negative feedback) is practically independent of the amplification of the tube. Thus, in large-scale manufacture of amplifiers comprising such a phase reversal tube, the latter may be selected at random from production subject to marked fluctuations of gain values.

The fact that the gain of the tube is not a function of, and in fact is independent of, the properties of the tubes will flow from the following:

The gain obtained with negative feedback, $V'$, is a function of the gain in the absence of negative feedback, the same thus being essentially a property of the tube according to the following equation:

$$V' = \frac{V}{1+\alpha V}$$

where $\alpha$ the fraction of the output potential which is in feedback relation with the input. If $V$ is large in contrast with unity and if $\alpha$ is not substantially less than unity, then $V'$ since unity is negligible in comparison with $\alpha V$ becomes approximately $=1/\alpha$, that is, independent of $V$. More particularly in the case where the full output potential is in reverse feedback relation with the input, in other words, where $\alpha$ is made approximately equal to unity, the amplification factor or gain of the stage in negative feedback will become independent of the gain of the tube itself $=1$, and this will be evident also in a graphical form.

In the drawing, Figs. 1, 2 and 3 show respectively different embodiments of the invention.

Referring to Fig. 1, the plate of the audio frequency (AF) amplifier tube N shown in the conventional manner is united by way of a condenser with the grid of the power tube $G_1$. At the same time the output potential of the tube N by way of condenser $C_1$ is impressed upon the grid of the phase reversing tube $p$, the plate of the latter being united with the control grid of tube $G_2$. The plates of the two tubes $G_1$ and $G_2$ are connected with the push-pull transformer T, the secondary winding of the latter being united with the loudspeaker L.

Now, tube $p$ is equipped with two means for negative or reverse feedback. A voltage reverse feedback is insured by the condenser $C_2$ and resistance $R_2$ in series being connected between the plate and the grid of the tube. A current feedback in reverse is obtained by virtue of the fact that the cathode resistance $R_1$ which serves for the production of the grid biasing voltage is not bridged or shunted capacitively. By choosing suitable dimensions the gain of the stage $p$ being in negative feedback connection is cut down to a level around unity. At the same time the phase and the amplitude distortions are eliminated almost entirely. The result is that upon the control grid of tube $G_2$ there is impressed an equal and opposite voltage as on the control grid of the tube $G_1$ so that an exactly symmetric push-pull drive of the two tubes is possible.

Another exemplified embodiment of the invention is shown in Fig. 2, where the tubes $G_1$ and $G_2$ are not represented. The difference compared with the circuit organization shown in Fig. 1 is essentially that the cathode resistance $R_1$ of the phase-reverser tube $p$ has been combined into one unit with the cathode resistance of tube N, and this resistance is not bridged or shunted by a capacitor. When the gain of the stage $p$ is exactly $=1$, then the alternating currents through the resistance R will just neutralize one another so that this resistance will set up no reverse feedback relation either for tube N or for tube $p$. What is saved in this circuit scheme is a resistance and a shunt condenser. This circuit organization will be of basic usefulness, that is, also without reverse feedback. However, in order to suppress distortions it will also in this case be expedient to insure voltage reverse feedback from the plate to the grid by $R_2$ and $C$ in series. The condenser $C$ should be chosen as large as feasible with a view to insuring reverse feedback under proper phase relations.

A further improvement upon the scheme shown in Fig. 2 resides in the arrangement of the resistance $R$ between the grid of the reverse feedback tube $p$ and the coupling condenser $C_1$. It will be understood that as a result of the reverse feedback the resistance of the grid-filament path of the reverse feedback tube $p$ is essentially reduced and this diminishes as a result also the size of the load resistance of the preceding tube $N$ which is undesirable in a good many practical cases. Now, this effect is largely eliminated by making the resistance $R$ high compared with the parallel connection of the plate resistance $R_a$ of tube $N$ and the inner resistance of this tube.

A circuit scheme as hereinbefore disclosed will be found useful wherever a phase reverser tube is employed for changing an alternating potential into an alternating potential of practically the same amplitude, through phase reversed through an angle of 180 degrees. In other words, its use is not restricted to an arrangement for establishing coupling relations with a push-pull amplifier stage.

A further exemplified embodiment is shown in Fig. 3 by the aid of a circuit scheme previously suggested in which the stray or interfering waves picked up by an auxiliary antenna $H$ are impressed upon the control grid of a phase reverser tube $p$ the plate of which is in alternating current connecting relation conjointly with the main antenna $A$, with the receiver input. The potential arising at the auxiliary antenna in reference to ground is impressed across an ohmic voltage divider $S$ whence the voltage is tapped and impressed upon the control grid of the tube $p$. The plate of the tube is associated by way of the large condenser $C_2$ with the non-grounded end of the antenna coil $L_A$. The identical end of the coil is united with the main antenna $A$ by way of the resistance $R_3$ whose value is approximately equal to the inner resistance of the tube $p$. The application of the invention to the present circuit organization resides in the use of the resistance $R_2$ whereby the plate alternating potential of tube $p$ is placed in reverse feedback relation with the control grid. If desired, it is further feasible to dispense with the parallel condenser to the cathode resistance $R_1$ of the tube. The resistance $R_4$ which is inserted between the control grid and the voltage divider tap, in a way similar to that underlying the circuit arrangement Fig. 2, prevents the alternating current resistance of the lower end of the voltage divider $S$ being apparently reduced as a result of the negative feedback.

If, what is readily obtainable, the voltage reverse feedback should predominate, then the inner resistance of tube $p$ will decrease. As a result, also $R_3$ can be made smaller and the damping of reception occasioned thereby can be diminished.

I claim:

1. In amplifying apparatus, a first stage comprising an electron discharge tube, a second stage comprising two electron discharge tubes connected in push pull relation, a phase reversing electron discharge tube, means connecting the output circuit of said first named electron discharge tube to the input circuit of one of said push-pull tubes and to the input circuit of said phase reversing tube in parallel, means connecting the output circuit of said phase reversing tube to the input circuit of said other push pull tube, and means for controlling the amplification characteristics of said phase reversing tube comprising between the output and input circuits thereof a negative voltage feedback circuit and an independent current feedback circuit.

2. In an arrangement for changing an alternating potential into an approximately equal amplitude alternating potential of opposite phase, a phase inverter tube having an input circuit and an output circuit, means for impressing the alternating potential to be changed upon the input circuit of said tube, and means providing a negative voltage feedback circuit and an independent current feedback circuit between the output circuit and the input circuit, the amount of said negative feedback in both feedback circuits being of such a value that the tube operates essentially without any substantial gain.

3. In combination with a pair of tubes connected in push pull, a driver circuit therefor including a first tube having an input circuit and an output circuit and an inverter tube having an input circuit and an output circuit, means for coupling the output circuit of said first tube both to an input electrode of one of said push pull tubes and to the input circuit of said inverter tube, means for coupling the output circuit of said inverter tube to an input electrode of the other of said push pull tubes, a negative voltage feedback circuit between the output circuit and the input circuit of said inverter tube, a negative current feedback circuit between the inverter tube output and input circuits, said negative feedback in both feedback circuits being chosen to provide sufficient negative feedback so that the amplitude of the energy fed from the output circuit of the first tube to said first named input electrode is substantially the same as the amplitude of the energy fed from the output circuit of the inverter tube to said input electrode of the second named push pull tube.

4. In amplifying apparatus, a first stage including an electron discharge tube having an anode, a cathode and a grid electrode, a second stage comprising a pair of electron discharge tubes connected push pull fashion, a phase reversing electron discharge tube having an anode, a cathode and a grid electrode, an output circuit for said first electron discharge device, means for coupling said output circuit to the input of one of said push pull tubes, an output circuit for said phase inverter tube and means for coupling said last named output circuit to the input of the other of said push pull tubes, a cathode resistor in the output circuit of said first named tube, said cathode resistor being also included in the output circuit of said phase inverter tube and being unbypassed thereby to provide degenerative current feedback for the inverter tube, a degenerative voltage feedback path between the anode and grid of the inverter tube, and means for coupling the output circuit of the first named tube between the grid and cathode of the phase inverter tube.

LOTHAR BRÜCK.